Sept. 6, 1955

R. A. SMITH 2,716,887

APPARATUS FOR MEASURING THE RESONANT
FREQUENCY OF A VIBRATORY ELEMENT

Filed Feb. 25, 1953

INVENTOR.
Roy A. Smith
BY
*Marvin Moody*
ATTORNEY

Sept. 6, 1955

R. A. SMITH 2,716,887

APPARATUS FOR MEASURING THE RESONANT
FREQUENCY OF A VIBRATORY ELEMENT

Filed Feb. 25, 1953

INVENTOR.
Roy A. Smith
BY
ATTORNEY

United States Patent Office 2,716,887
Patented Sept. 6, 1955

2,716,887

APPARATUS FOR MEASURING THE RESONANT FREQUENCY OF A VIBRATORY ELEMENT

Roy A. Smith, Sun Valley, Calif., assignor to Collins Radio Company, Cedar Rapids, Iowa, a corporation of Iowa Application February 25, 1953, Serial No. 338,801

3 Claims. (Cl. 73—69)

This invention relates in general to frequency measuring means and in particular to apparatus for measuring the resonant frequency of a mechanical vibrator.

It oftentimes becomes necessary to measure the resonant frequency of a mechanical vibrator, as for example, a disc used in an electromechanical filter such as described in Patent No. 2,615,981 entitled "Electro-mechanical Filter" which issued October 28, 1952. These resonant discs must be tuned in the radio frequency range, as for example, 455 kilocycles, and this requires the maintainance of very fine tolerances.

It is an object of this invention therefore to provide a jig for tuning a mechanical disc.

Another object of this invention is to provide an air coupled apparatus for measuring the resonant frequency of a vibrating member.

A feature of this invention is found in the provision for exciting a mechanical resonator by air vibrations and picking up the vibrations of said resonator with a transducer. Further objects, features and advantages of the invention will become apparent from the following description and claims when read in view of the drawings, in which:

Figure 1:
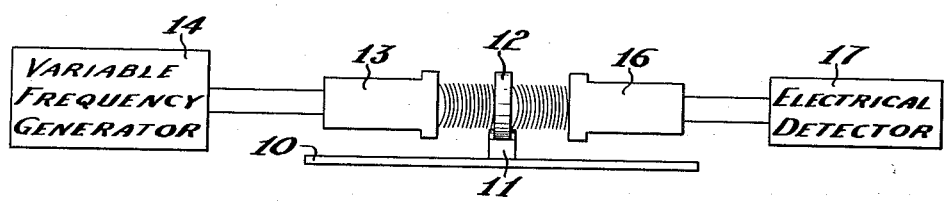
Figure 1 illustrates the problem to be solved.

Figure 1 illustrates a base plate 10 which has a holding member 11 that supports a disc 12. A driving transducer 13 is connected to a variable frequency oscillator 14 and excites the disc so as to cause it to vibrate. A receiving transducer 16 is coupled to the disc 12 to pick up its vibrations and is connected to an electrical detector which indicates the amplitude of the vibrations of the disc.

With the apparatus of Figure 1, the resonant frequency of the disc may be measured by noting the amplitude of output of the detector 17 as the frequency of the generator 14 is varied. At the resonant point of the disc it will be excited to much greater amplitude than at the non-resonant points and will thus produce a large energy level that will be picked up by the receiving transducer 16.

Figure 2:
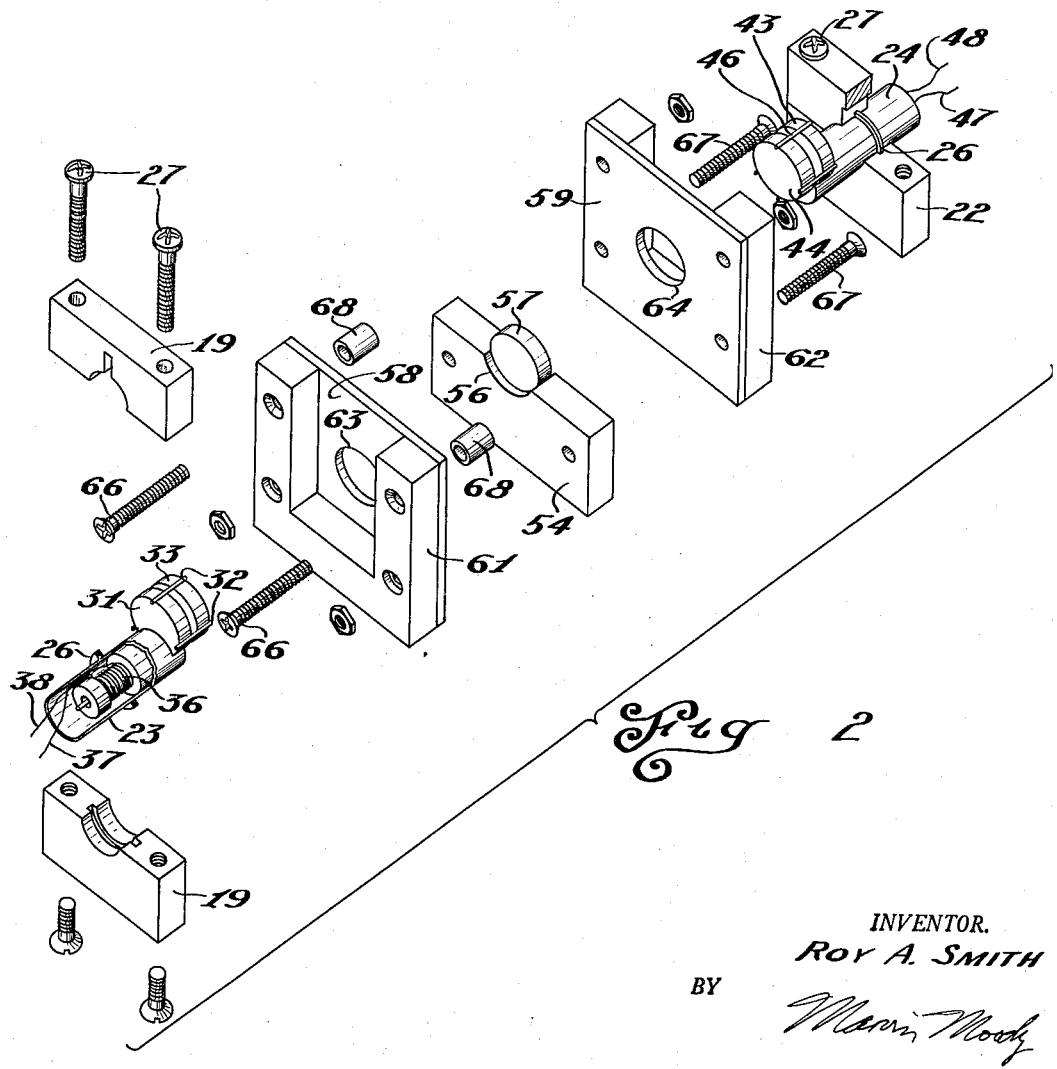
Figure 2 is an exploded view of the apparatus according to this invention.
Figure 3:
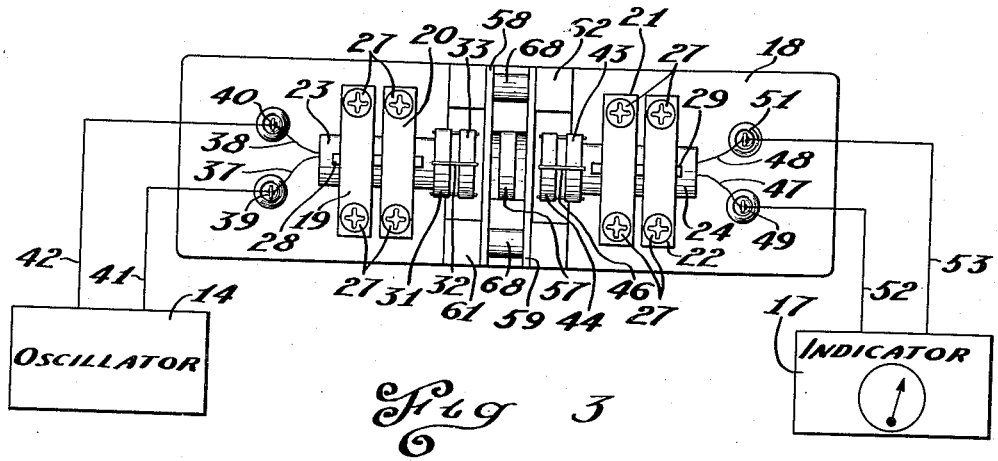
Figure 3 is a top view of the apparatus according to this invention.
Figure 4:
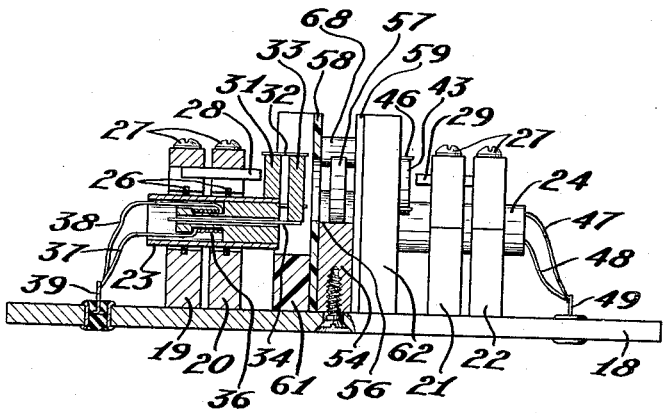
Figure 4 is a partial sectional view of the apparatus shown in Figure 3.

In practice, it is desirable to isolate the exciting and receiving transducers so that there is no direct coupling between them. This necessitates electrical shielding and also shielding from air vibrations which might pass directly from the driving transducer 13 to the receiving transducer 16. Apparatus for accomplishing this is shown in Figures 2, 3 and 4.

A base plate 18 has mounted thereon stand-offs 19, 20, 21 and 22. Two stand-offs are mounted at either end so as to give mechanical rigidity and eliminate spurious vibrations. The stand-offs are formed with transverse openings which receive cylinders 23 and 24 therethrough. The cylinders 23 and 24 are supported by the stand-offs and separated therefrom by rubber rings 26.

The stand-offs 19 through 22 are formed in two parts and held together by suitable holding means, as for example, screws 27.

Biasing magnets 28 and 29 are supported by the stand-offs above the cylinders 23 and 24. The cylinder 23 has a mechanical supporting disc 31 attached to its upper periphery and the disc 31 has a plurality of flexible supporting wires or rods 32 attached to its periphery. The rods 32 are in turn connected to a driving disc 33.

The driving disc 33 has a driving rod 34 attached to its periphery which extends within the confines of the cylinder 23 as shown in the sectional view of Figure 4 and through a driving coil 36 mounted in the cylinder 23. The driving coil 36 has a pair of leads 37 and 38 attached thereto which are connected to terminals 39 and 40 mounted in the base plate 18.

The oscillator 14 is connected to terminals 39 and 40 by leads 41 and 42.

In a similar manner, the stand-offs 21 and 22 support the cylinder 24. A mechanical supporting disc 43 is attached thereto and supports a receiving disc 44 by means of longitudinal supporting wires or rods 46. A pickup coil, similar to driving coil 36, is mounted within the cylinder 24 and is connected to leads 47 and 48 which are in turn connected to terminals 49 and 51. A pick-up rod, similar to driving rod 35, is connected to the periphery of the pick-up disc 44 and extends within the pick-up coil. Terminals 49 and 51 are connected to leads 52 and 53 which are connected to the indicator 17.

Mounted between the driving disc 33 and the pick-up disc 44 is a support member 54 which might be made of a suitable phenol'; material and which is formed with a crescent-shaped opening 56 to receive the disc 57 that is to be tested.

To either side of the phenolic holding member 54 are a pair of shield members comprising plates 58 and 59, respectively, that are attached to suitable brackets 61 and 62 which are connectable to the base plate 18. The plates 58 and 59 are formed with openings 63 and 64, respectively, which are approximately of the same diameter as the disc 57 and in alignment therewith.

The driving disc 33 is in alignment with the opening 63 and the pick-up disc 44 is in alignment with the opening 64. Transverse holding means, as for example, the screws 66 and 67, pass through the members 61 and 62 and support member 54 to form a rigid assembly. Spacer washers 68 separate the plates 58 and 59.

In operation, the variable frequency generator 14 excites the magnetostriction driving wire 34 which in turn causes the disc 33 to vibrate. These vibrations cause the air to move in the vicinity of the disc and moving air passing through the hole 63 excites the test specimen 57. If the received energy is at a resonant frequency of the disc, the disc will resonate and transmit air fluctuations through the hole 64 to the pick-up transducer disc 44. The vibrations of the disc 44 will be reconverted into electrical energy and supplied to the indicator 17.

At 455 kilocycles a wave length in air is only 0.029 inch and it becomes very important to prevent direct coupling between the driving coil and the output coil. The electrical conducting shields 23 and 24 substantially eliminate electrical coupling between the two, and the baffle plates 58 and 59 substantially eliminate mechanical coupling between them. Also, the members 61, 54 and 62 are made of a non-resonant material, as for example, a suitable phenolic so as to prevent formation of a mechanical resonant system in the vicinity of the disc's resonant frequency.

It is seen that the present invention provides means for measuring the resonant frequency of a mechanical vibrating member, and although it has been described with respect to a preferred embodiment thereof, it is not to be so limited as changes and modifications may be made therein which are within the full intended scope of the invention, as defined by the appended claims.

I claim:

1. Apparatus for measuring the frequency response of a mechanical resonator comprising, a base plate, a support member mounted on said base plate, the mechanical resonator received in said support member, a first stand-off mounted on one side of said support member, a second stand-off mounted on the other side of said support member, a pair of cylinders with the first supported by the first stand-off and the second supported by the second stand-off, a pair of supporting discs attached, respectively, to the first and second cylinders, a driving disc, a plurality of supporting rods connected to the periphery of said driving disc and the periphery of the first supporting disc, a second plurality of supporting rods, a pick-up disc with the second supporting rods attached to its periphery and to the periphery of the second supporting disc, a driving rod of magnetostrictive material attached to the periphery of said driving disc and extending within the confines of the first cylinder, a pick-up rod of magnetostrictive material attached to the periphery of said pick-up disc and extending within the confines of the second cylinder, a driving coil mounted in said first cylinder about said driving rod, an oscillator connected to said driving coil, a pick-up coil mounted in said second cylinder about said pick-up rod, an amplitude indicator connected to said pick-up coil, a pair of biasing magnets supported by the first and second stand-offs, said driving disc and said pick-up disc being oppositely disposed in spaced, parallel planes, a first shield plate mounted on the base plate between the driving disc and the mechanical resonator and formed with an opening in axial alignment with said driving disc and said resonator, and a second shield plate mounted on the base plate between the mechanical resonator and the pick-up disc and formed with an opening in axial alignment with said pick-up disc and said resonator.

2. Apparatus for measuring the frequency response of a mechanical resonator comprising, a base plate, a support member mounted on said base plate, the mechanical resonator received in said support member, a first stand-off mounted on one side of said support member, a second stand-off mounted on the other side of said support member, a pair of cylinders with the first supported by the first stand-off and the second supported by the second stand-off, a pair of supporting discs attached, respectively, to the first and second cylinders, a driving disc, a plurality of supporting rods connected to the periphery of said driving disc and the periphery of the first supporting disc, a second plurality of supporting rods, a pick-up disc with the second supporting rods attached to its periphery and to the periphery of the second supporting disc, a magnetostrictive driving rod attached to the periphery of said driving disc and extending within the confines of the first cylinder, a magnetostrictive pick-up rod attached to the periphery of said pick-up disc and extending within the confines of the second cylinder, a driving coil mounted in said first cylinder coaxially with said driving rod, an oscillator connected to said driving coil, a pick-up coil mounted in said second cylinder coaxially with said pick-up rod, an amplitude indicator connected to said pick-up coil, a pair of biasing magnets supported by the first and second stand-offs, said pick-up disc being axially displaced from said driving disc in opposed relation thereto, a first shield plate mounted on the base plate between the driving disc and the mechanical resonator and formed with an opening in axial alignment with said driving disc and said resonator, a second shielding disc mounted on the base plate between the mechanical resonator and the pick-up disc and formed with an opening in axial alignment with said pick-up disc and said resonator, and said first and second shield members and said support member constructed of a material which is non-resonant at the resonant frequencies of the mechanical resonator.

3. Apparatus for measuring the resonant frequency of a vibratory element by coupling energy through the surrounding air comprising an input electrical-mechanical transducer including a vibratory member having a transmitting surface exposed to the surrounding air, a variable frequency oscillator electrically connected to said first transducer for energizing said vibratory member at selectable frequencies, an output mechanical-electrical transducer including a vibratory member having a receiving surface, means for electrically isolating said output transducer from said input transducer, a detector electrically connected to said output transducer for measuring the energy transmitted between said surfaces, said transmitting and receiving surfaces being disposed oppositely in spaced, parallel relation and defining an energy transmission path therebetween, support means for holding said element in said energy transmission path, shield means comprising a plate defining an opening, said plate being positioned between said transmitting and receiving surfaces with said opening aligned with said path, said shield means and said support means having a resonant frequency outside the range of variation of said oscillator, whereby said element is adapted to transfer all the energy as measured by said detector between said transmitting and receiving surfaces.

References Cited in the file of this patent

UNITED STATES PATENTS

| | | |
|---|---|---|
| 2,141,277 | Nickel | Dec. 27, 1938 |
| 2,484,623 | Heising | Oct. 11, 1949 |
| 2,486,984 | Rowe | Nov. 1, 1949 |
| 2,576,423 | Stewart | Nov. 27, 1951 |
| 2,655,035 | Erwin | Oct. 13, 1953 |
| 2,656,516 | Doelz | Oct. 20, 1953 |